United States Patent
Asakawa et al.

(10) Patent No.: US 12,159,969 B2
(45) Date of Patent: *Dec. 3, 2024

(54) LITHIUM-ION SECONDARY BATTERY

(71) Applicants: MURATA MANUFACTURING CO., LTD., Kyoto (JP); Hydro-Quebec, Montreal (CA)

(72) Inventors: Yuichiro Asakawa, Tokyo (JP); Hirofumi Tsuiki, Tokyo (JP); Hiroshi Ueno, Tokyo (JP); Birhanu Assresahegn Dasalegn, Varennes (CA); Jean-Christophe Daigle, Varennes (CA); Karim Zaghib, Varennes (CA)

(73) Assignees: Murata Manufacturing Co., Ltd., Kyoto (JP); Hydro-Quebec, Montreal (CA)

( * ) Notice: Subject to any disclaimer, the term of this patent is extended or adjusted under 35 U.S.C. 154(b) by 712 days.

This patent is subject to a terminal disclaimer.

(21) Appl. No.: 17/201,527

(22) Filed: Mar. 15, 2021

(65) Prior Publication Data

US 2021/0202995 A1 Jul. 1, 2021

Related U.S. Application Data

(63) Continuation of application No. PCT/JP2018/035973, filed on Sep. 27, 2018.

(51) Int. Cl.
*H01M 10/0567* (2010.01)
*H01M 4/485* (2010.01)
*H01M 4/58* (2010.01)
*H01M 10/0525* (2010.01)
H01M 10/42 (2006.01)

(52) U.S. Cl.
CPC ....... *H01M 10/0567* (2013.01); *H01M 4/485* (2013.01); *H01M 4/5825* (2013.01); *H01M 10/0525* (2013.01); H01M 2010/4292 (2013.01); H01M 2300/0037 (2013.01)

(58) Field of Classification Search
CPC ...... H01M 4/485; H01M 4/58; H01M 4/5825; H01M 10/0525; H01M 10/0567; H01M 2010/4292; H01M 2300/0025; H01M 2300/0037
See application file for complete search history.

(56) References Cited

U.S. PATENT DOCUMENTS

| 10,497,966 | B2 * | 12/2019 | Asakawa | H01M 4/485 |
| 2003/0180626 | A1 * | 9/2003 | Shima | H01M 10/0567 |
| | | | | 429/231.95 |
| 2004/0202941 | A1 | 10/2004 | Ugawa | |
| 2006/0093911 | A1 * | 5/2006 | Chiga | H01M 4/366 |
| | | | | 429/321 |
| 2006/0147809 | A1 | 7/2006 | Amine et al. | |
| 2007/0196740 | A1 * | 8/2007 | Haruna | H01M 10/0567 |
| | | | | 429/341 |
| 2009/0286160 | A1 * | 11/2009 | Kozono | H01M 4/131 |
| | | | | 429/231.5 |
| 2010/0178570 | A1 | 7/2010 | Kozono et al. | |
| 2012/0202125 | A1 | 8/2012 | Han | |
| 2013/0164584 | A1 * | 6/2013 | Scott | A61N 1/378 |
| | | | | 429/94 |
| 2013/0330623 | A1 * | 12/2013 | Matsushita | H01M 4/485 |
| | | | | 429/231.95 |
| 2014/0134490 | A1 * | 5/2014 | Balaya | H01M 4/5825 |
| | | | | 252/182.1 |
| 2015/0221997 | A1 | 8/2015 | Hallac et al. | |
| 2016/0099481 | A1 * | 4/2016 | Akagawa | H01M 10/52 |
| | | | | 429/185 |
| 2016/0204432 | A1 | 7/2016 | Koshiba et al. | |
| 2018/0013143 | A1 | 1/2018 | Asakawa et al. | |
| 2018/0183093 | A1 | 6/2018 | Asakawa et al. | |
| 2019/0097269 | A1 * | 3/2019 | Cheng | H01M 4/483 |

FOREIGN PATENT DOCUMENTS

| CN | 104466249 | | 3/2015 | |
| CN | 105493332 | | 4/2016 | |
| CN | 106328998 | | 1/2017 | |
| CN | 108172894 | | 6/2018 | |
| CN | 108172894 | A * | 6/2018 | ........ H01M 10/0525 |
| CN | 108258311 | | 7/2018 | |
| CN | 108281709 | | 7/2018 | |
| EP | 2 503 632 | | 9/2012 | |
| EP | 2 863 469 | | 4/2015 | |

(Continued)

OTHER PUBLICATIONS

CN108172894A English translation as taught by Cheng (Year: 2018).*

(Continued)

*Primary Examiner* — Anca Eoff
(74) *Attorney, Agent, or Firm* — K&L Gates LLP

(57) ABSTRACT

A lithium-ion secondary battery includes a positive electrode, a negative electrode, and an electrolytic solution. The negative electrode includes a negative electrode active material having a reaction potential of 0.5 V or higher than a lithium electrode, and has an electrochemical capacity per unit area of less than or equal to an electrochemical capacity per unit area of the positive electrode. The electrolytic solution includes a solvent, an electrolyte salt, and at least one of a diphenyl carbonate compound, an unsaturated cyclic carbonate ester, a first maleic anhydride compound, and a second maleic anhydride compound.

6 Claims, 4 Drawing Sheets

(56) References Cited

FOREIGN PATENT DOCUMENTS

| | | |
|---|---|---|
| EP | 3 012 896 | 4/2016 |
| JP | 2000058115 A | 2/2000 |
| JP | 2004311272 A | 11/2004 |
| JP | 2011054490 A | 3/2011 |
| KR | 10-2016-0054472 | 5/2016 |
| WO | 2015033620 A1 | 3/2015 |
| WO | WO-2017035132 A1 * | 3/2017 |
| WO | 2017/210573 | 12/2017 |
| WO | 2018116529 A1 | 6/2018 |
| WO | WO-2020065834 A1 * | 4/2020 ........ H01M 10/0431 |

OTHER PUBLICATIONS

WO2020065834a1, english translation as taught by Asakawa (Year: 2020).*

European Search Report issued Aug. 23, 2022 in corresponding European Application No. 18935318.8.
European Search Report issued Apr. 14, 2022 in corresponding European Application No. 18935318.8.
Korean Office Action issued Dec. 13, 2022 in corresponding Korean Application No. 10-2021-7008917.
International Search Report for Application No. PCT/JP2018/035973, dated Nov. 6, 2018.
Sheng Shui Zhang, "A review on electrolyte additives for lithium-ion batteries", Journal of Power Sources, vol. 162, pp. 1379-1394, Oct. 10, 2006.
Chinese Office Action issued Jan. 31, 2024 in corresponding Chinese Application No. 201880097990.1.
Chinese Office Action issued Aug. 30, 2024 in corresponding Chinese Application No. 201880097990.1.

* cited by examiner

LITHIUM-ION SECONDARY BATTERY

CROSS REFERENCE TO RELATED APPLICATIONS

The present application is a continuation of PCT patent application no. PCT/JP2018/035973, filed on Sep. 27, 2018, the entire contents of which are being incorporated herein by reference.

BACKGROUND

The present technology generally relates to a lithium-ion secondary battery including a positive electrode, a negative electrode, and an electrolytic solution.

Various electronic apparatuses such as mobile phones have been widely used. Accordingly, a lithium-ion secondary battery, which is smaller in size and lighter in weight and allows for a higher energy density, is under development as a power source.

A lithium-ion secondary battery includes a positive electrode, a negative electrode, and an electrolytic solution. A configuration of the lithium-ion secondary battery greatly influences battery characteristics. Accordingly, various considerations have been given to the configuration of the lithium-ion secondary battery. Specifically, to improve a cycle life, a negative electrode active material into which lithium is insertable and from which lithium is extractable at 0.4 V or higher versus a lithium electrode is used in a lithium-ion secondary battery in which an electrical capacity of a negative electrode is smaller than or equal to an electrical capacity of a positive electrode.

SUMMARY

The present technology generally relates to a lithium-ion secondary battery including a positive electrode, a negative electrode, and an electrolytic solution.

Electronic apparatuses, on which a lithium-ion secondary battery is to be mounted, are increasingly gaining higher performance and more functions, causing more frequent use of the electronic apparatuses and expanding a use environment of the electronic apparatuses. Accordingly, there is still room for improvement in terms of battery characteristics of the lithium-ion secondary battery.

The present technology has been made in view of such an issue and it is an object of the technology to provide a lithium-ion secondary battery that makes it possible to achieve a superior battery characteristic.

A lithium-ion secondary battery according to an embodiment of the technology includes a positive electrode, a negative electrode, and an electrolytic solution. The negative electrode includes a negative electrode active material having a reaction potential of 0.5 V or higher than a lithium electrode, and has an electrochemical capacity per unit area of less than or equal to an electrochemical capacity per unit area of the positive electrode. The electrolytic solution includes a solvent, an electrolyte salt, and at least one of a diphenyl carbonate compound represented by Formula (1) below, an unsaturated cyclic carbonate ester represented by Formula (2) below, a first maleic anhydride compound represented by Formula (3) below, or a second maleic anhydride compound represented by Formula (4) below.

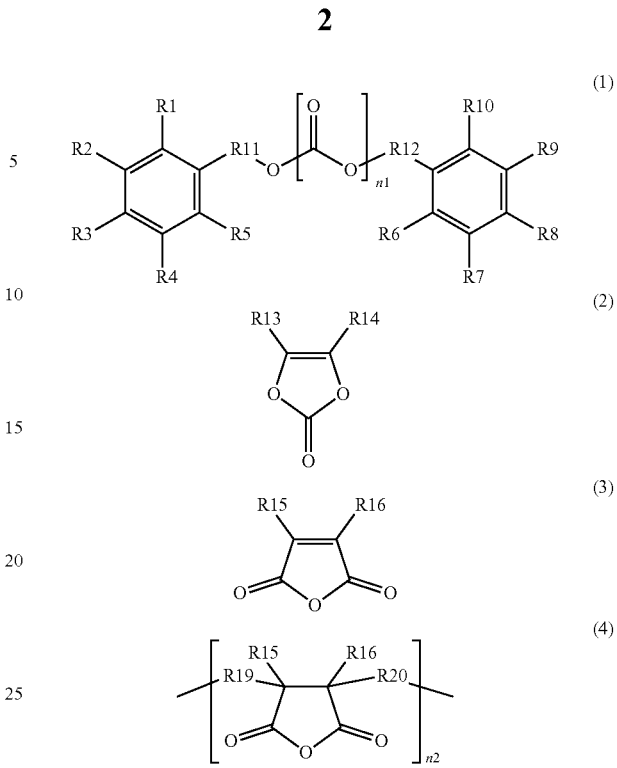

where:
  each of R1 to R10 and R13 to R18 includes one of a hydrogen atom, a halogen atom, a monovalent hydrocarbon group, and a monovalent halogenated hydrocarbon group;
  each of R11 and R12 includes one of a divalent hydrocarbon group and a divalent halogenated hydrocarbon group;
  each of R19 and R20 includes one of a divalent hydrocarbon group, a divalent oxygen-containing hydrocarbon group, a divalent halogenated hydrocarbon group, and a divalent halogenated oxygen-containing hydrocarbon group;
  each of R11, R12, R19, and R20 is omittable; and
  each of n1 and n2 is an integer of 1 or greater.

According to the lithium-ion secondary battery of the present technology, in the case where the negative electrode includes the negative electrode active material having the reaction potential of 0.5 V or higher than a lithium electrode and has the electrochemical capacity per unit area of less than or equal to the electrochemical capacity per unit area of the positive electrode, the electrolytic solution includes at least one of the diphenyl carbonate compound, the unsaturated cyclic carbonate ester, the first maleic anhydride compound, an the second maleic anhydride compound. Accordingly, it is possible to achieve a superior battery characteristic.

It should be understood that effects of the technology are not necessarily limited to those described above and may include any of a series of effects described below in relation to the technology.

DETAILED DESCRIPTION

As described herein, the present disclosure will be described based on examples with reference to the drawings, but the present disclosure is not to be considered limited to the examples, and various numerical values and materials in the examples are considered by way of example.

A description is given first of a lithium-ion secondary battery according to one embodiment of the technology.

The lithium-ion secondary battery described below includes a positive electrode 21 and a negative electrode 22, which will be described later. The lithium-ion secondary battery obtains a battery capacity by utilizing a lithium insertion phenomenon and a lithium extraction phenomenon, as described above. More specifically, the lithium-ion secondary battery obtains, for example, a capacity of the negative electrode 22 by utilizing the lithium insertion phenomenon and the lithium extraction phenomenon.

Figure 1:
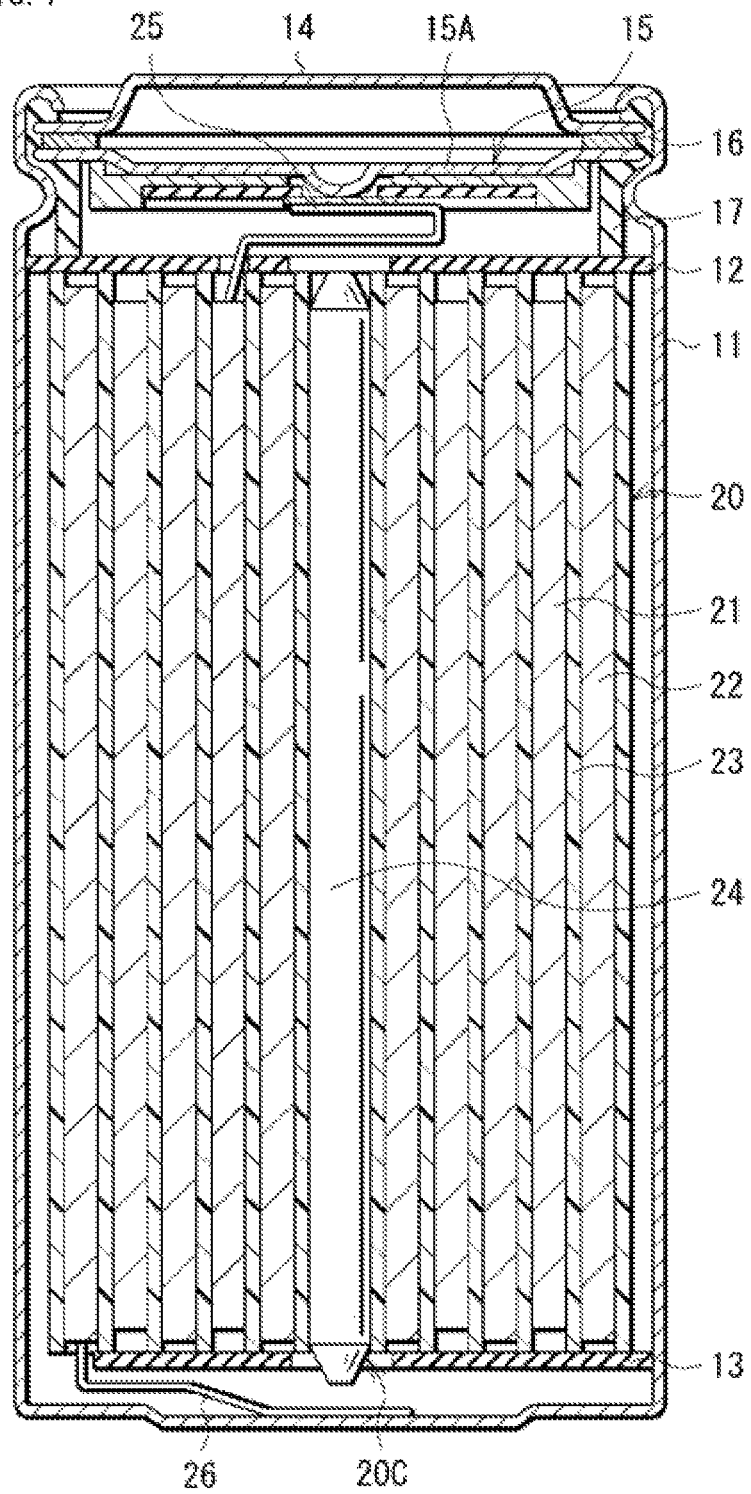
FIG. 1 is a sectional view of a configuration of a lithium-ion secondary battery (cylindrical type) according to an embodiment of the present technology.
Figure 2:
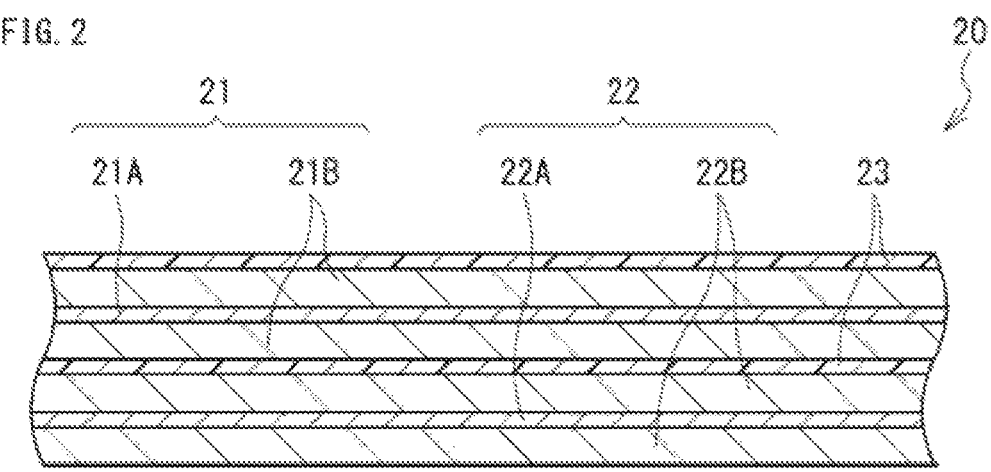
FIG. 2 is an enlarged sectional view of a configuration of a main part of the lithium-ion secondary battery illustrated in FIG. 1.

FIG. 1 illustrates a sectional configuration of the lithium-ion secondary battery. FIG. 2 illustrates an enlarged sectional configuration of a main part, i.e., a wound electrode body 20, of the lithium-ion secondary battery illustrated in FIG. 1. It should be understood that FIG. 2 illustrates only a part of the wound electrode body 20.

Referring to FIG. 1, the lithium-ion secondary battery is of a cylindrical type, for example. The lithium-ion secondary battery is provided with a battery can 11 that has a cylindrical shape. The battery can 11 contains the wound electrode body 20, for example. The wound electrode body 20 serves as a battery device.

Specifically, the lithium-ion secondary battery includes a pair of insulating plates 12 and 13 and the wound electrode body 20 that are provided in the battery can 11, for example. The wound electrode body 20 is a structure in which, for example, the positive electrode 21 and the negative electrode 22 are stacked on each other with a separator 23 interposed therebetween, and also in which the stack of the positive electrode 21, the negative electrode 22, and the separator 23 is wound. The wound electrode body 20 is impregnated with an electrolytic solution. The electrolytic solution is a liquid electrolyte.

The battery can 11 has a hollow cylindrical structure having a closed end and an open end, for example. The battery can 11 includes, for example, a metal material such as iron. For example, the battery can 11 has a surface that may be plated with a metal material such as nickel. The insulating plate 12 and the insulating plate 13 each extend in a direction intersecting a wound peripheral surface of the wound electrode body 20, for example. The insulating plate 12 and the insulating plate 13 are disposed in such a manner as to interpose the wound electrode body 20 therebetween, for example.

A battery cover 14, a safety valve mechanism 15, and a positive temperature coefficient device (PTC device) 16 are crimped at the open end of the battery can 11 by means of a gasket 17, for example, thereby sealing the open end of the battery can 11. The battery cover 14 includes a material similar to a material included in the battery can 11, for example. The safety valve mechanism 15 and the positive temperature coefficient device 16 are each disposed on an inner side of the battery cover 14. The safety valve mechanism 15 is electrically coupled to the battery cover 14 via the positive temperature coefficient device 16. For example, when an internal pressure of the battery can 11 reaches a certain level or higher as a result of causes including, without limitation, internal short circuit and heating from outside, a disk plate 15A inverts in the safety valve mechanism 15, thereby cutting off the electrical coupling between the battery cover 14 and the wound electrode body 20. The positive temperature coefficient device 16 involves an increase in resistance in accordance with a rise in temperature, in order to prevent abnormal heat generation resulting from a large current. The gasket 17 includes an insulating material, for example. The gasket 17 may have a surface on which a material such as asphalt is applied, for example.

A center pin 24 is disposed in a space 20C provided at the winding center of the wound electrode body 20, for example. It should be understood, however, that the center pin 24 may not necessarily be disposed in the space 20C. A positive electrode lead 25 is coupled to the positive electrode 21. The positive electrode lead 25 includes an electrically conductive material such as aluminum. The positive electrode lead 25 is electrically coupled to the battery cover 14 via the safety valve mechanism 15, for example. A negative electrode lead 26 is coupled to the negative electrode 22. The negative electrode lead 26 includes an electrically conductive material such as nickel. The negative electrode lead 26 is electrically coupled to the battery can 11, for example.

As illustrated in FIG. 2, the positive electrode 21 includes, for example, a positive electrode current collector 21A, and a positive electrode active material layer 21B provided on the positive electrode current collector 21A. The positive electrode active material layer 21B may be provided, for example, only on one side of the positive electrode current collector 21A, or on each of both sides of the positive electrode current collector 21A. FIG. 2 illustrates a case where the positive electrode active material layer 21B is provided on each of the both sides of the positive electrode current collector 21A, for example.

The positive electrode current collector 21A includes, for example, an electrically conductive material such as aluminum. The positive electrode active material layer 21B includes, as a positive electrode active material or positive electrode active materials, one or more of positive electrode materials into which lithium is insertable and from which lithium is extractable. The positive electrode active material layer 21B may further include one or more of other materials, examples of which include a positive electrode binder and a positive electrode conductor.

The positive electrode material includes a lithium compound, for example. The term "lithium compound" is a generic term for a compound that includes lithium as a constituent element. A reason for this is that a high energy density is achievable. The lithium compound is not limited to a particular kind, and examples thereof include a lithium composite oxide and a lithium phosphate compound.

The term "lithium composite oxide" is a generic term for an oxide that includes, as constituent elements, lithium and one or more of other elements. The lithium composite oxide has any of crystal structures including, without limitation, a layered rock-salt crystal structure and a spinel crystal structure, for example. The term "lithium phosphate compound" is a generic term for a phosphate compound that includes, as constituent elements, lithium and one or more of the other elements. The lithium phosphate compound has a crystal structure such as an olivine crystal structure, for example.

The other elements are elements other than lithium. The other elements are not limited to particular kinds; however, it is preferable that the other elements belong to groups 2 to 15 in the long periodic table of elements, in particular. A reason for this is that a higher voltage is obtainable. Specific examples of the other elements include nickel, cobalt, manganese, and iron.

Examples of the lithium composite oxide having the layered rock-salt crystal structure include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$. Examples of the lithium composite oxide having the spinel crystal structure include $LiMn_2O_4$. Examples of the lithium phosphate compound having the olivine crystal structure include $LiFePO_4$, $LiMnPO_4$, $LiMn_{0.5}Fe_{0.5}PO_4$, $LiMn_{0.7}Fe_{0.3}PO_4$, and $LiMn_{0.75}Fe_{0.25}PO_4$.

In particular, it is preferable that the positive electrode material include a material having a reaction potential of 4.0 V or higher versus a lithium electrode (vs $Li/Li^+$), i.e., a high reaction potential material. A reason for this is that the high reaction potential material is markedly stable upon charging and discharging, thereby causing the charging and discharging reactions to proceed stably.

The high reaction potential material is not limited to a particular kind, and examples thereof include a lithium manganese iron phosphate compound which is one of the lithium phosphate compounds described above. The lithium manganese iron phosphate compound is a phosphate compound that includes, as constituent elements, lithium (Li), manganese (Mn), and iron (Fe). More specifically, the lithium manganese iron phosphate compound is, for example, a compound represented by Formula (11) below. As is apparent from Formula (11), the lithium manganese iron phosphate compound may further include one or more of other metal elements (M11) as constituent elements.

$$LiMn_xFe_yM11_{1-x-y}PO_4 \qquad (11)$$

where:
  M11 is at least one of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), or tungsten (W); and
  x and y satisfy $0<x<1$ and $0<x<1$.

Specific examples of the high reaction potential material include: $LiMn_{0.5}Fe_{0.5}PO_4$, $LiMn_{0.7}Fe_{0.3}PO_4$, and $LiMn_{0.75}Fe_{0.25}PO_4$, which do not include the other metal elements (M11) as constituent elements; and $LiMn_{0.75}Fe_{0.20}Mg_{0.05}PO_4$, which includes the other metal element (M11) as a constituent element.

The positive electrode binder includes materials including, without limitation, a synthetic rubber and a polymer compound, for example. Examples of the synthetic rubber include a styrene-butadiene-based rubber. Examples of the polymer compound include polyvinylidene difluoride and polyimide.

The positive electrode conductor includes, for example, an electrically conductive material such as a carbon material. Examples of the carbon material include graphite, carbon black, acetylene black, and Ketjen black. The positive electrode conductor may include a material such as a metal material or an electrically conductive polymer.

As illustrated in FIG. 2, the negative electrode 22 includes, for example, a negative electrode current collector 22A, and a negative electrode active material layer 22B provided on the negative electrode current collector 22A. The negative electrode active material layer 22B may be provided, for example, only on one side of the negative electrode current collector 22A, or on each of both sides of the negative electrode current collector 22A. FIG. 2 illustrates a case where the negative electrode active material layer 22B is provided on each of the both sides of the negative electrode current collector 22A, for example.

The negative electrode current collector 22A includes, for example, an electrically conductive material such as copper. It is preferable that the negative electrode current collector 22A have a surface roughened by a method such as an electrolysis method. A reason for this is that improved adherence of the negative electrode active material layer 22B to the negative electrode current collector 22A is achievable by utilizing an anchor effect.

The negative electrode active material layer 22B includes, as a negative electrode active material or negative electrode active materials, one or more of negative electrode materials into which lithium is insertable and from which lithium is extractable. The negative electrode active material layer 22B may further include another material, examples of which include a negative electrode binder and a negative electrode conductor.

The negative electrode material includes a material having a reaction potential of 0.5 V or higher versus a lithium electrode, i.e., a low reaction potential material. A reason for this is that the low reaction potential material is electrochemically stable as compared with, for example, a material such as a carbon material, thereby having electrochemically low reactivity. This reduces a decomposition reaction of the electrolytic solution associated with the reactivity of the negative electrode 22.

The low reaction potential material is not limited to a particular kind, and examples thereof include a titanium-containing compound and a niobium-containing compound. The term "titanium-containing compound" is a generic term for a material that includes titanium (Ti) as a constituent element. Examples of the titanium-containing compound include a titanium oxide, a lithium-titanium composite oxide, a hydrogen-titanium compound. The term "niobium-containing compound" is a generic term for a material that includes niobium (Nb) as a constituent element. Examples of the niobium-containing compound include a lithium-niobium composite oxide, a hydrogen-niobium compound, and a titanium-niobium composite oxide. It should be understood that a material corresponding to the niobium-containing compound is excluded from the titanium-containing compound.

The titanium oxide is, for example, a compound represented by Formula (21) below, that is, for example, a bronze-type titanium oxide.

$$TiO_w \qquad (21)$$

where w satisfies $1.85 \leq w \leq 2.15$.

The titanium oxide ($TiO_2$) may be, for example, an anatase-type titanium oxide, a rutile-type titanium oxide, or a brookite-type titanium oxide. However, the titanium oxide may also be a composite oxide including, as constituent elements, titanium and one or more of phosphorus, vanadium, tin, copper, nickel, iron, and cobalt. Examples of the composite oxide include $TiO_2$—$P_2O_5$, $TiO_2$—$V_2O_5$, $TiO_2$—$P_2O_5$—$SnO_2$, and $TiO_2$—$P_2O_5$-MeO. Me includes, for example, one or more of elements including, without limitation, copper, nickel, iron, and cobalt. It should be understood that a potential at which lithium is inserted into or extracted from the titanium oxide is, for example, 1 V to 2 V versus a lithium electrode.

The term "lithium-titanium composite oxide" is a generic term for a composite oxide that includes lithium and titanium as constituent elements. Specific examples of the lithium-titanium composite oxide include respective compounds represented by Formulae (22) to (24) below, i.e., ramsdellite-type lithium titanium oxides, for example. M22 included in Formula (22) is a metal element that is to be a divalent ion. M23 included in Formula (23) is a metal element that is to be a trivalent ion. M24 included in Formula (24) is a metal element that is to be a tetravalent ion.

$$Li[Li_xM22_{(1-3x)/2}Ti_{(3+x)/2}]O_4 \quad (22)$$

where:
M22 is at least one of magnesium (Mg), calcium (Ca), copper (Cu), zinc (Zn), or strontium (Sr); and
x satisfies 0≤x≤1/3.

$$Li[Li_yM23_{1-3y}Ti_{1+2y}]O_4 \quad (23)$$

where:
M23 is at least one of aluminum (Al), scandium (Sc), chromium (Cr), manganese (Mn), iron (Fe), germanium (Ga), or yttrium (Y); and
y satisfies 0≤y≤1/3.

$$Li[Li_{1/3}M24_zTi_{(5/3)-z}]O_4 \quad (24)$$

where:
M24 is at least one of vanadium (V), zirconium (Zr), or niobium (Nb); and
z satisfies 0≤z≤2/3.

A crystal structure of the lithium-titanium composite oxide is not particularly limited; however, it is preferable that the lithium-titanium composite oxide have a spinel crystal structure. A reason for this is that the crystal structure is prevented from varying easily upon charging and discharging, thereby stabilizing battery characteristics.

Specific examples of the lithium-titanium composite oxide represented by Formula (22) include $Li_{3.75}Ti_{4.875}Mg_{0.375}O_{12}$. Specific examples of the lithium-titanium composite oxide represented by Formula (23) include $LiCrTiO_4$. Specific examples of the lithium-titanium composite oxide represented by Formula (24) include $Li_4Ti_5O_{12}$ and $Li_4Ti_{4.95}Nb_{0.05}O_{12}$.

The term "hydrogen-titanium compound" is a generic term for a composite oxide that includes hydrogen and titanium as constituent elements. Specific examples of the hydrogen-titanium compound include $H_2Ti_3O_7$ ($3TiO_2 \cdot 1H_2O$), $H_6Ti_{12}O_{27}$ ($3TiO_2 \cdot 0.75H_2O$), $H_2Ti_6O_{13}$ ($3TiO_2 \cdot 0.5H_2O$), $H_2Ti_7O_{15}$ ($3TiO_2 \cdot 0.43H_2O$), and $H_2Ti_{12}O_{25}$ ($3TiO_2 \cdot 0.25H_2O$).

The term "lithium-niobium composite oxide" is a generic term for a composite oxide that includes lithium and niobium as constituent elements, and examples thereof include $LiNbO_2$. The term "hydrogen-niobium compound" is a generic term for a composite oxide that includes hydrogen and titanium as constituent elements, and examples thereof include $H_4Nb_6O_{17}$. The term "titanium-niobium composite oxide" is a generic term for a composite oxide that includes, for example, titanium and niobium as constituent elements, and examples thereof include $TiNb_2O$; and $Ti_2Nb_{10}O_{29}$. The titanium-niobium composite oxide may intercalate, for example, lithium. An amount of intercalated lithium with respect to the titanium-niobium composite oxide is not particularly limited. For example, the amount of lithium to be intercalated into $TiNb_2O_7$ is up to four equivalents relative to $TiNb_2O_7$.

An electrochemical capacity per unit area of the negative electrode 22 is less than or equal to an electrochemical capacity per unit area of the positive electrode 21; thus, an end-of-charge electrode of the lithium-ion secondary battery is the negative electrode 22. In other words, a chargeable capacity of the negative electrode material included in the negative electrode 22 is equal to a discharge capacity of the positive electrode 21 or smaller than the discharge capacity of the positive electrode 21; therefore, whether the charging reaction of the lithium-ion secondary battery is terminated is determined in accordance with the chargeable capacity of the negative electrode 22. This is to smoothly and stably proceed charging and discharging reactions using the low reaction potential material as the negative electrode active material.

More specifically, the fact that the electrochemical capacity per unit area of the negative electrode 22 is less than or equal to the electrochemical capacity per unit area of the positive electrode 21 means that the two conditions described below are satisfied. In the following, a series of capacities, i.e., a charge capacity and a discharge capacity, related to charging and discharging of the lithium-ion secondary battery is defined, and thereafter the two conditions will be described.

First, a series of capacities, i.e., charge capacities and discharge capacities, related to the positive electrode 21 is as follows.

Initial-cycle charge capacity Qc1 per unit area (mAh/cm²) of positive electrode 21=[initial-cycle charge capacity qc1 (mAh/g) of positive electrode active material×ratio rc of positive electrode active material to positive electrode active material layer 21B×area density 1c (mg/cm²) of positive electrode active material layer 21B]/1000.

Initial-cycle discharge capacity Qc1' per unit area (mAh/cm²) of positive electrode 21=[initial-cycle charge capacity qc1 (mAh/g) of positive electrode active material×initial-cycle charge and discharge efficiency Ec1 of positive electrode 21×ratio rc of positive electrode active material to positive electrode active material layer 21B×area density 1c (mg/cm²) of positive electrode active material layer 21B]/1000.

Second- or subsequent-cycle charge capacity QcN per unit area (mAh/cm²) of positive electrode 21=[initial-cycle discharge capacity Qc1' per unit area (mAh/g) of positive electrode 21×charge and discharge efficiency EcN of positive electrode 21]/1000.

Second- or subsequent-cycle discharge capacity QcN' per unit area (mAh/cm²) of positive electrode 21=[immediately-preceding-cycle charge capacity QcN per unit area of positive electrode 21×charge and discharge efficiency EcN of positive electrode 21]/1000.

Next, a series of capacities, i.e., charge capacities and discharge capacities, related to the negative electrode 22 is as follows.

Initial-cycle charge capacity Qa1 per unit area (mAh/cm²) of negative electrode 22=[initial-cycle charge capacity qa1 (mAh/g) of negative electrode active material×ratio ra of negative electrode active material to negative electrode active material layer 22B×area density 1a (mg/cm²) of negative electrode active material layer 22B]/1000.

Initial-cycle discharge capacity Qa1' per unit area (mAh/cm²) of negative electrode 22=[initial-cycle charge capacity qa1 (mAh/g) of negative electrode active material×initial-cycle charge and discharge efficiency Ea1 of negative electrode 22×ratio ra of negative electrode active material to negative electrode active material layer 22B/area density 1a (mg/cm$^2$) of negative electrode active material layer 22B]/1000.

Second- or subsequent-cycle charge capacity QaN per unit area (mAh/cm$^2$) of negative electrode 22=[initial-cycle discharge capacity Qa1' per unit area (mAh/g) of negative electrode 22×charge and discharge efficiency EaN of negative electrode 22]/1000.

Second- or subsequent-cycle discharge capacity QaN' per unit area (mAh/cm$^2$) of negative electrode 22=[immediately-preceding-cycle charge capacity QaN per unit area of negative electrode 22×charge and discharge efficiency EaN of negative electrode 22]/1000.

In such a case, the electrochemical capacity per unit area of the negative electrode 22 is less than or equal to the electrochemical capacity per unit area of the positive electrode 21, and hence, the following two conditions are satisfied.

Initial-cycle charge capacity Qc1 per unit area (mAh/cm$^2$) of positive electrode 21≥initial-cycle charge capacity Qa1 per unit area (mAh/cm$^2$) of negative electrode 22

Second- or subsequent-cycle charge capacity QcN per unit area (mAh/cm$^2$) of positive electrode 21≥ second- or subsequent-cycle charge capacity QaN per unit area (mAh/cm$^2$) of negative electrode 22

Accordingly, an amount of the negative electrode active material included in the negative electrode 22 and an amount of the positive electrode active material included in the positive electrode 21 are adjusted with respect to each other in such a manner that the electrochemical capacity per unit area of the negative electrode 22 is less than or equal to the electrochemical capacity per unit area of the positive electrode 21.

It should be understood that the negative electrode material may further include, for example, one or more of other negative electrode materials other than the low reaction potential material. Examples of the other negative electrode materials include a carbon material and a metal-based material. The term "carbon material" is a generic term for a material including carbon as a constituent element. Examples of the carbon material include graphitizable carbon, non-graphitizable carbon, and graphite. The term "metal-based material" is a generic term for a material including one or more of metal elements as a constituent element or constituent elements. Examples of the metal elements include silicon and tin. The metal-based material may be a simple substance, an alloy, a compound, a mixture of two or more thereof, or a material including one or more phases thereof. The metal-based material may include, for example, one or more of metalloid elements. Specific examples of the metal-based material include Si, SiO$_v$, (0<v≤2), Sn, SnO$_w$ (0<w≤2), SnSiO$_3$, and Mg$_2$Sn.

Details of the negative electrode binder are similar to those of the positive electrode binder, for example. Details of the negative electrode conductor are similar to those of the positive electrode conductor, for example.

(Method of Forming Negative Electrode Active Material Layer)

A method of forming the negative electrode active material layer 22B is not particularly limited, and examples thereof include a coating method, a vapor-phase method, a liquid-phase method, a thermal spraying method, and a firing (sintering) method. For example, the coating method involves coating the negative electrode current collector 22A with a solution in which a mixture of materials including, without limitation, a particulate or powdered negative electrode active material and the negative electrode binder is dissolved or dispersed in a solvent such as an organic solvent. Examples of the vapor-phase method include a physical deposition method and a chemical deposition method. More specific examples of the vapor-phase method include a vacuum deposition method, a sputtering method, an ion plating method, a laser ablation method, a thermal chemical vapor deposition method, a chemical vapor deposition (CVD) method, and a plasma chemical vapor deposition method. Examples of the liquid-phase method include an electrolytic plating method and an electroless plating method. The thermal spraying method involves spraying a fused or semi-fused negative electrode active material onto the negative electrode current collector 22A. The firing method involves applying a solution onto the negative electrode current collector 22A by the coating method, and thereafter subjecting the applied solution (a coating) to heat treatment at a temperature higher than a melting point of a material such as the negative electrode binder, for example. More specific examples of the firing method include an atmosphere firing method, a reactive firing method, and a hot-press firing method.

The separator 23 includes a porous film of a material such as a synthetic resin or ceramic, for example. The separator 23 may be a stacked film including two or more porous films that are stacked on each other, in one example. Examples of the synthetic resin include polyethylene.

In particular, the separator 23 may include the porous film and a polymer compound layer, for example. The porous film serves as a base layer. The polymer compound layer is provided on one side or on each of both sides of the base layer, for example. A reason for this is that adherence of the separator 23 to the positive electrode 21 improves and adherence of the separator 23 to the negative electrode 22 also improves to suppress distortion of the wound electrode body 20. This reduces a decomposition reaction of the electrolytic solution and also reduces leakage of the electrolytic solution with which the base layer is impregnated.

The polymer compound layer includes a polymer compound such as polyvinylidene difluoride, for example. A reason for this is that such a polymer compound has superior physical strength and is electrochemically stable. For example, the polymer compound layer may include insulating particles such as inorganic particles. A reason for this is that safety improves. The inorganic particles are not limited to a particular kind, and examples thereof include aluminum oxide and aluminum nitride.

The wound electrode body 20 is impregnated with the electrolytic solution, as described above. Accordingly, the positive electrode 21, the negative electrode 22, and the separator 23 are each impregnated with the electrolytic solution, for example.

The electrolytic solution includes a solvent, an electrolyte salt, and an addition compound. Only one addition compound may be used, or two or more addition compounds may be used. In a similar manner, only one solvent may be used, or two or more solvents may be used, and only one electrolyte salt may be used, or two or more electrolyte salts may be used.

The addition compound is a compound to be added to the electrolytic solution (the solvent and the electrolyte salt). Specifically, the addition compound includes one or more of a diphenyl carbonate compound represented by Formula (1) below, an unsaturated cyclic carbonate ester represented by Formula (2) below, a first maleic anhydride compound represented by Formula (3) below, and a second maleic anhydride compound represented by Formula (4) below.

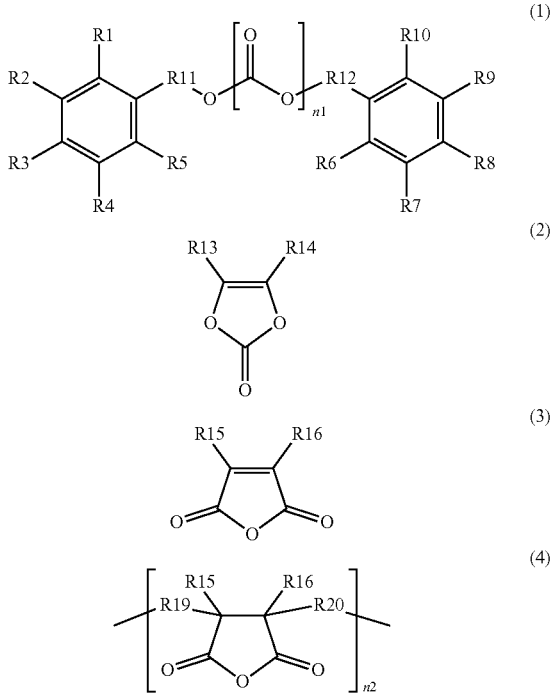

(1)
(2)
(3)
(4)

where:
each of R1 to R10 and R13 to R18 is one of a hydrogen atom, a halogen atom, a monovalent hydrocarbon group, and a monovalent halogenated hydrocarbon group;
each of R11 and R12 is one of a divalent hydrocarbon group and a divalent halogenated hydrocarbon group;
each of R19 and R20 is one of a divalent hydrocarbon group, a divalent oxygen-containing hydrocarbon group, a divalent halogenated hydrocarbon group, and a divalent halogenated oxygen-containing hydrocarbon group;
each of R11, R12, R19, and R20 is omittable; and
each of n1 and n2 is an integer of 1 or greater.

A reason why the electrolytic solution includes the addition compound is that formation, on a surface of the negative electrode 22, of a satisfactory film derived from the addition compound at the time of earlier cycles of charging and discharging of the lithium-ion secondary battery allows the negative electrode 22 to be electrochemically protected by the film. This improves chemical stability of the electrolytic solution, thereby reducing the decomposition reaction of the electrolytic solution. In this case, in particular, gas generation due to the decomposition reaction of the electrolytic solution is also reduced.

Specifically, in a case where the negative electrode 22 includes a low reaction potential material and has the electrochemical capacity per unit area of less than or equal to the electrochemical capacity per unit area of the positive electrode 21, inclusion of the addition compound in the electrolytic solution causes a dense film having a multilayered structure to be formed on the surface of the negative electrode 22 upon the earlier cycles of charging and discharging, i.e., in a state in which a reaction potential is low. This reduces a side reaction, that is, the decomposition reaction of the electrolytic solution on the surface of the negative electrode 22, in the earlier and subsequent charging and discharging processes.

In particular, the side reaction that occurs on the surface of the negative electrode 22 is markedly reduced in this case, which suppresses deviation of a balance between the discharge capacity of the positive electrode 21 and the charge capacity of the negative electrode 22 from an appropriate balance even if charging and discharging are repeated. In addition, the electrochemical capacity per unit area of the negative electrode 22 is less than or equal to the electrochemical capacity per unit area of the positive electrode 21, which causes a high discharge potential band of the positive electrode 21 not to be used in the charging and discharging processes. This reduces a degradation reaction of the positive electrode 21 and also suppresses an increase in an electric resistance caused by the degradation of the positive electrode 21.

Therefore, in a lithium-ion secondary battery in which the film derived from the addition compound is formed on the surface of the negative electrode 22, the decomposition reaction of the electrolytic solution is markedly reduced even if such a lithium-ion secondary battery is charged and discharged in a severe environment such as a high-temperature environment or a low-temperature environment, or is stored in such a severe environment.

The diphenyl carbonate compound is, as indicated in Formula (1), a compound having diphenyl carbonate as a skeleton. Only one diphenyl carbonate compound may be used, or two or more diphenyl carbonate compounds may be used.

As described above, each of R1 to R10 is not particularly limited as long as each of R1 to R10 is one of a hydrogen atom, a halogen atom, a monovalent hydrocarbon group, and a monovalent halogenated hydrocarbon group.

The halogen group atom is, for example, one of a fluorine atom (—F), a chlorine atom (—Cl), a bromine atom (—Br), and an iodine atom (—I).

The term "monovalent hydrocarbon group" is a generic term for a monovalent group including carbon (C) and hydrogen (H). The monovalent hydrocarbon group may have, for example: a straight-chain structure; a branched structure having one or more side chains; a cyclic structure; or a structure in a state in which two or more thereof are bonded to each other. The monovalent hydrocarbon group may include, for example, one or more carbon-carbon unsaturated bonds, or may include no carbon-carbon unsaturated bond. The carbon-carbon unsaturated bond includes a carbon-carbon double bond (>C=C<) and a carbon-carbon triple bond (—C≡C—).

Specific examples of the monovalent hydrocarbon group include an alkyl group, an alkenyl group, an alkynyl group, a cycloalkyl group, an aryl group, and a monovalent bonded group. The "monovalent bonded group" is a monovalent group in which two or more of an alkyl group, an alkenyl group, an alkynyl group, a cycloalkyl group, and an aryl group are bonded to each other.

The alkyl group is not limited to a particular kind, and examples thereof include a methyl group, an ethyl group, a propyl group, and a butyl group. The alkenyl group is not limited to a particular kind, and examples thereof include an ethenyl group, a propenyl group, and a butenyl group. The alkynyl group is not limited to a particular kind, and examples thereof include an ethynyl group, a propynyl group, and a butynyl group. The cycloalkyl group is not limited to a particular kind, and examples thereof include a cyclopropyl group, a cyclobutyl group, a cyclopentyl group, and a cyclohexyl group. The aryl group is not limited to a particular kind, and examples thereof include a phenyl group and a naphthyl group. The monovalent bonded group is not limited to a particular kind, and examples thereof include a benzyl group.

The alkyl group has carbon number from 1 to 4, for example, although the carbon number of the alkyl group is not particularly limited. The alkenyl group and the alkynyl group each have carbon number from 2 to 4, for example, although the carbon number of each of the alkenyl group and the alkynyl group is not particularly limited. The cycloalkyl group has carbon number from 3 to 6, for example, although the carbon number of the cycloalkyl group is not particularly limited. The aryl group has carbon number from 6 to 14, for example, although the carbon number of the aryl group is not particularly limited. A reason for this is that solubility and compatibility of the diphenyl carbonate compound improve.

The monovalent halogenated hydrocarbon group is a group in which one or more of hydrogen atoms (—H) in the monovalent hydrocarbon group described above are substituted by a halogen group or halogen groups. Details of the halogen atom included in the monovalent halogenated hydrocarbon group are similar to those of the halogen atom described above. For example, only one halogen atom may be included in the monovalent halogenated hydrocarbon group, or two or more halogen atoms may be included in the monovalent halogenated hydrocarbon group.

As described above, each of R11 and R12 is not particularly limited as long as each of R11 and R12 is one of a divalent hydrocarbon group and a divalent halogenated hydrocarbon group.

The term "divalent hydrocarbon group" is a generic term for a divalent group including carbon and hydrogen. The divalent hydrocarbon group may have, for example: a straight-chain structure; a branched structure having one or more side chains; a cyclic structure; or a structure in a state in which two or more thereof are bonded to each other. The divalent hydrocarbon group may include, for example, one or more carbon-carbon unsaturated bonds, or may include no carbon-carbon unsaturated bond.

Specific examples of the divalent hydrocarbon group include an alkylene group, an alkenylene group, an alkynylene group, a cycloalkylene group, an arylene group, and a divalent bonded group. The "divalent bonded group" is a divalent group in which two or more of an alkylene group, an alkenylene group, an alkynylene group, a cycloalkylene group, and an arylene group are bonded to each other.

The alkylene group is not limited to a particular kind, and examples thereof include a methylene group, an ethylene group, a propylene group, and a butylene group. The alkenylene group is not limited to a particular kind, and examples thereof include an ethenylene group, a propenylene group, and a butenylene group. The alkynylene group is not limited to a particular kind, and examples thereof include an ethynylene group, a propynylene group, and a butynylene group. The cycloalkylene group is not limited to a particular kind, and examples thereof include a cyclopropylene group, a cyclobutylene group, a cyclopentylene group, and a cyclohexylene group. The arylene group is not limited to a particular kind, and examples thereof include a phenylene group and a naphthylene group. The divalent bonded group is not limited to a particular kind, and examples thereof include a benzylene group.

The alkylene group has carbon number from 1 to 4, for example, although the carbon number of the alkylene group is not particularly limited. The alkenylene group and the alkynylene group each have carbon number from 2 to 4, for example, although the carbon number of each of the alkenylene group and the alkynylene group is not particularly limited. The cycloalkylene group has carbon number from 3 to 6, for example, although the carbon number of the cycloalkylene group is not particularly limited. The arylene group has carbon number from 6 to 14, for example, although the carbon number of the arylene group is not particularly limited. A reason for this is that solubility and compatibility of the second maleic anhydride compound improve.

The divalent halogenated hydrocarbon group is a group in which one or more of hydrogen atoms in the divalent hydrocarbon group described above are substituted by a halogen atom or halogen atoms. Details of the halogen atom included in the divalent halogenated hydrocarbon group are similar to those of the halogen atom described above, for example. Only one halogen atom may be included in the divalent halogenated hydrocarbon group, or two or more halogen atoms may be included in the divalent halogenated hydrocarbon group.

Each of R11 and R12 is omittable. That is, only R11 may be omitted, only R12 may be omitted, or both R11 and R12 may be omitted.

Specific examples of the diphenyl carbonate compound include diphenyl carbonate, dibenzyl carbonate, dibenzyl dicarbonate, and bis(pentafluorophenyl) carbonate.

The unsaturated cyclic carbonate ester is, as indicated in Formula (2), a carbonate ester having one or more carbon-carbon unsaturated bonds (carbon-carbon double bonds) in the ring. One unsaturated cyclic carbonate ester may be used, or two or more unsaturated cyclic carbonate esters may be used.

As described above, each of R13 and R14 is not particularly limited as long as each of R13 and R14 is one of a hydrogen atom, a halogen atom, a monovalent hydrocarbon group, and a monovalent halogenated hydrocarbon group. Details of each of the halogen atom, the monovalent hydrocarbon group, and the monovalent halogenated hydrocarbon group are as described above.

Specific examples of the unsaturated cyclic carbonate ester include vinylene carbonate (1,3-dioxol-2-one), methylvinylene carbonate (4-methyl-1,3-dioxole-2-one), ethylvinylene carbonate (4-ethyl-1,3-dioxole-2-one), 4,5-dimethyl-1,3-dioxole-2-one, 4,5-diethyl-1,3-dioxole-2-one, 4-fluoro-1,3-dioxole-2-one, and 4-trifluoromethyl-1,3-dioxole-2-one.

The first maleic anhydride compound is, as indicated in Formula (3), a compound having maleic anhydride as a skeleton. Only one first maleic anhydride compound may be used, or two or more first maleic anhydride compounds may be used.

As described above, each of R15 and R16 is not particularly limited as long as each of R15 and R16 is one of a hydrogen group, a halogen group, a monovalent hydrocarbon group, and a monovalent halogenated hydrocarbon group. Details of each of the halogen group, the monovalent hydrocarbon group, and the monovalent halogenated hydrocarbon group are as described above.

Specific examples of the first maleic anhydride compound include maleic anhydride, 2,3-dimethyl maleic anhydride, 2.5-dihydro-2,5-dioxo-3-furanacetic acid, and citraconic anhydride.

The second maleic anhydride compound is, as indicated in Formula (4), a compound having polymaleic anhydride as a skeleton. Only one second maleic anhydride compound may be used, or two or more second maleic anhydride compounds may be used.

As described above, each of R17 and R18 is not particularly limited as long as each of R17 and R18 is one of a hydrogen atom, a halogen atom, a monovalent hydrocarbon group, and a monovalent halogenated hydrocarbon group. Details of each of the halogen group, the monovalent hydrocarbon group, and the monovalent halogenated hydrocarbon group are as described above.

As described above, each of R19 and R20 is not particularly limited as long as each of R19 and R20 is one of a divalent hydrocarbon group, a divalent oxygen-containing hydrocarbon group, a divalent halogenated hydrocarbon group, and a divalent halogenated oxygen-containing hydrocarbon group. Details of each of the divalent hydrocarbon group and the divalent halogenated hydrocarbon group are as described above.

The term "divalent oxygen-containing hydrocarbon group" is a generic term for a group in which one or more ether bonds (—O—) are introduced into the divalent hydrocarbon group described above. The ether bond may be introduced, as a part of a functional group including oxygen as a constituent element, into the divalent hydrocarbon group. The functional group is not limited to a particular kind, and examples thereof include one or more of an alkoxy group, a carbonyl group, and a carboxy group. The alkoxy group has carbon number from 1 to 4, although the carbon number of the alkoxy group is not particularly limited. Specific examples of the alkoxy group include a methoxy group and an ethoxy group.

The divalent halogenated oxygen-containing hydrocarbon group is a group in which one or more of hydrogen atoms in the divalent oxygen-containing hydrocarbon group described above are substituted by a halogen group or halogen atoms. Details of the halogen atom included in the divalent halogenated oxygen-containing hydrocarbon group are similar to those of the halogen atom described above. Only one halogen atom may be included in the divalent halogenated oxygen-containing hydrocarbon group, or two or more halogen atoms may be included in the divalent halogenated oxygen-containing hydrocarbon group.

Each of R19 and R20 is omittable. That is, only R19 may be omitted, only R20 may be omitted, or both R19 and R20 may be omitted.

In particular, it is preferable that the second maleic anhydride compound be a compound represented by Formula (5) below. A reason for this is that it becomes easier for a film derived from the second maleic anhydride compound to be formed and also a structure of the film further improves.

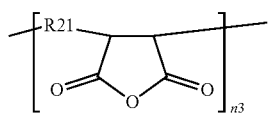

(5)

where:
R21 is one of a divalent hydrocarbon group, a divalent oxygen-containing hydrocarbon group, a divalent halogenated hydrocarbon group, and a divalent oxygen-containing hydrocarbon group; and
n2 is an integer of 1 or greater.

The second maleic anhydride compound represented by Formula (5) is a compound in which each of R17 and R18 in Formula (4) is a hydrogen atom, R19 in Formula (4) (R21 in Formula (5)) is present, and R20 in Formula (4) is absent.

As described above, R21 is not particularly limited as long as R21 is one of a divalent hydrocarbon group, a divalent oxygen-containing hydrocarbon group, a divalent halogenated hydrocarbon group, and a divalent halogenated oxygen-containing hydrocarbon group. Details of each of the divalent hydrocarbon group and the divalent halogenated hydrocarbon group are as described above.

A weight average molecular weight of the second maleic anhydride compound is not particularly limited, and may be set to any value. That is, the value of n2 in the second maleic anhydride compound represented by Formula (4) may be set to any number. In a similar manner, the value of n3 in the second maleic anhydride compound represented by Formula (5) may be set to any number. The weight average molecular weight of the second maleic anhydride is, for example, 10000 to 1000000.

Specific examples of the second maleic anhydride compound include an ethylene-maleic anhydride copolymer in which R21 is an ethylene group (—$C_2H_4$—), a normal propylene-maleic anhydride copolymer in which R21 is a normal propylene group (—$C_3H_6$—), a normal butene-maleic anhydride copolymer in which R21 is a normal butylene group (—$C_4H_8$—), an isobutene-maleic anhydride copolymer in which R21 is an isobutylene group (—C(—$CH_3$)$_2$—$CH_2$—), and a methyl vinyl ether-maleic anhydride copolymer in which R21 is an ethylene group into which a methoxy group is introduced (—$CH_2$—CH(—$OCH_3$)—).

In particular, it is preferable that the addition compound be the second maleic anhydride compound. Inclusion of, as the addition compound, the second maleic anhydride compound serving as a polymer material in the electrolytic solution causes the film to be formed at the time of earlier cycles of charging and discharging, as described above. In this case, a film having a regular structure, i.e., a dense structure, is formed, because electrochemical decomposition of the polymer material is suppressed at the time of earlier cycles of charging and discharging. That is, the second maleic anhydride compound serving as the polymer material covers the surface of the negative electrode 22 as it is without electrochemically reacting at the time of earlier cycles of charging and discharging, thereby forming the film having the dense structure resulting from the regular structure of the second maleic anhydride compound. This sufficiently improves chemical stability of the electrolytic solution, thereby sufficiently reducing the decomposition reaction of the electrolytic solution.

A content of the addition compound, i.e., a total content of the diphenyl compound, the unsaturated cyclic carbonate ester, the first maleic anhydride compound, and the second maleic anhydride compound in the electrolytic solution is not particularly limited. In particular, the total content of the addition compound is preferably higher than or equal to 0.1 wt % and lower than or equal to 10 wt %, and more preferably higher than or equal to 0.3 wt % and lower than or equal to 2 wt %. A reason for this is that solubility and compatibility of the addition compound are secured, and the chemical stability of the electrolytic solution also improves sufficiently.

It should be understood that, in a case where each of the diphenyl compound, the unsaturated cyclic carbonate ester, and the first maleic anhydride compound is used alone, a content of each of the diphenyl compound, the unsaturated cyclic carbonate ester, and the first maleic anhydride compound in the electrolytic solution is preferably higher than or equal to 0.1 wt % and lower than or equal to 10 wt %, and more preferably higher than or equal to 0.3 wt % and lower than or equal to 2 wt %.

In a case where the second maleic anhydride compound is used alone, a content of the second maleic anhydride compound in the electrolytic solution is preferably higher than or equal to 0.1 wt % and lower than or equal to 10 wt %, and more preferably higher than or equal to 0.15 wt % and lower than or equal to 3.5 wt %.

The solvent includes one or more of non-aqueous solvents (organic solvents), for example. An electrolytic solution including the non-aqueous solvent is a so-called non-aqueous electrolytic solution.

The non-aqueous solvent is not limited to a particular kind, and examples thereof include a cyclic carbonate ester, a chain carbonate ester, a lactone, a chain carboxylate ester, and a nitrile (mononitrile) compound. Examples of the cyclic carbonate ester include ethylene carbonate and propylene carbonate. Examples of the chain carbonate ester include dimethyl carbonate and diethyl carbonate. Examples of the lactone include γ-butyrolactone and γ-valerolactone. Examples of the chain carboxylate ester include methyl acetate, ethyl acetate, and methyl propionate. Examples of the nitrile compound include acetonitrile, methoxy acetonitrile, and 3-methoxy propionitrile.

Examples of the non-aqueous solvent further include another unsaturated cyclic carbonate ester, a halogenated carbonate ester, a sulfonate ester, an acid anhydride, a dicyano compound (a dinitrile compound), a diisocyanate compound, and a phosphate ester. Examples of the other unsaturated cyclic carbonate ester include vinyl ethylene carbonate and methylene ethylene carbonate. Examples of the halogenated carbonate ester include 4-fluoro-1,3-dioxolane-2-one, 4,5-difluoro-1,3-dioxolane-2-one, and fluoromethyl methyl carbonate. Examples of the sulfonate ester include 1,3-propane sultone and 1,3-propene sultone. Examples of the acid anhydride include succinic anhydride, glutaric anhydride, maleic anhydride, ethane disulfonic anhydride, propane disulfonic anhydride, sulfobenzoic anhydride, sulfopropionic anhydride, and sulfobutyric anhydride. Examples of the dinitrile compound include succinonitrile, glutaronitrile, adiponitrile, and phthalonitrile. Examples of the diisocyanate compound include hexamethylene diisocyanate. Examples of the phosphate ester include trimethyl phosphate and triethyl phosphate.

The electrolyte salt includes one or more of lithium salts, for example. The lithium salt is not limited to a particular kind, and examples thereof include lithium hexafluorophosphate ($LiPF_6$), lithium tetrafluoroborate ($LiBF_4$), lithium bis(fluorosulfonyl)imide ($LiN(SO_2F)_2$), lithium bis(trifluoromethane sulfonyl)imide ($LiN(CF_3SO_2)_2$), lithium difluorophosphate ($LiPF_2O_2$), and lithium fluorophosphate ($Li_2PFO_3$). A content of the electrolyte salt is, for example, more than or equal to 0.3 mol/kg and less than or equal to 3.0 mol/kg with respect to the solvent, but is not particularly limited thereto.

Upon charging the lithium-ion secondary battery, for example, lithium ions are extracted from the positive electrode 21, and the extracted lithium ions are inserted into the negative electrode 22 via the electrolytic solution. Upon discharging the lithium-ion secondary battery, for example, lithium ions are extracted from the negative electrode 22, and the extracted lithium ions are inserted into the positive electrode 21 via the electrolytic solution.

The lithium-ion secondary battery is manufactured by the following procedure, for example. Fabrication of the positive electrode 21, fabrication of the negative electrode 22, and preparation of the electrolytic solution are performed, following which assembly of the lithium-ion secondary battery is performed.

[Fabrication of Positive Electrode]

First, the positive electrode active material is mixed with materials including, without limitation, the positive electrode binder and the positive electrode conductor on an as-needed basis to thereby obtain a positive electrode mixture. Thereafter, the positive electrode mixture is dispersed or dissolved into a solvent such as an organic solvent to thereby prepare a paste positive electrode mixture slurry. Lastly, the positive electrode mixture slurry is applied on both sides of the positive electrode current collector 21A, following which the applied positive electrode mixture slurry is dried to thereby form the positive electrode active material layers 21B. Thereafter, the positive electrode active material layers 21B may be compression-molded by means of a machine such as a roll pressing machine. In this case, the positive electrode active material layers 21B may be heated. The positive electrode active material layers 21B may be compression-molded a plurality of times.

The negative electrode active material layers 22B are formed on both sides of the negative electrode current collector 22A by a procedure similar to the fabrication procedure of the positive electrode 21 described above. Specifically, the negative electrode active material is mixed with materials including, without limitation, the negative electrode positive electrode binder and the negative electrode conductor on an as-needed basis to thereby obtain a negative electrode mixture. Thereafter, the negative electrode mixture is dispersed or dissolved into a solvent such as an organic solvent to thereby prepare a paste negative electrode mixture slurry. Thereafter, the negative electrode mixture slurry is applied on both sides of the negative electrode current collector 22A, following which the applied negative electrode mixture slurry is dried to thereby form the negative electrode active material layers 22B. Thereafter, the negative electrode active material layers 22B may be compression-molded.

The electrolyte salt is added to a solvent and the solvent is stirred. Thereafter, the addition compound is added to the solvent and the solvent is further stirred. The addition compound is, as described above, one or more of the diphenyl carbonate compound, the unsaturated cyclic carbonate ester, the first maleic anhydride compound, and the second maleic anhydride compound. Thus, the electrolyte salt and the addition compound are dispersed or dissolved in the solvent.

First, the positive electrode lead 25 is coupled to the positive electrode current collector 21A by a method such as a welding method, and the negative electrode lead 26 is coupled to the negative electrode current collector 22A by a method such as a welding method. Thereafter, the positive electrode 21 and the negative electrode 22 are stacked on each other with the separator 23 interposed therebetween, following which the positive electrode 21, the negative electrode 22, and the separator 23 are wound to thereby form a wound body. Thereafter, the center pin 24 is disposed in the space 20C provided at the winding center of the wound body.

Thereafter, the wound body is interposed between the pair of insulating plates 12 and 13, and the wound body in that state is contained in the battery can 11 together with the insulating plates 12 and 13. In this case, the positive electrode lead 25 is coupled to the safety valve mechanism 15 by a method such as a welding method, and the negative electrode lead 26 is coupled to the battery can 11 by a method such as a welding method. Thereafter, the electrolytic solution is injected into the battery can 11 to thereby impregnate the wound body with the electrolytic solution, causing each of the positive electrode 21, the negative electrode 22, and the separator 23 to be impregnated with the electrolytic solution. As a result, the wound electrode body 20 is formed.

Lastly, the open end of the battery can 11 is crimped by means of the gasket 17 to thereby attach the battery cover 14, the safety valve mechanism 15, and the positive temperature coefficient device 16 to the open end of the battery can 11. Thus, the wound electrode body 20 is sealed in the battery can 11. As a result, the lithium-ion secondary battery is completed.

According to the cylindrical lithium-ion secondary battery, in the case where the negative electrode 22 includes the low reaction potential material as the negative electrode active material and has the electrochemical capacity per unit area of less than or equal to the electrochemical capacity per unit area of the positive electrode 21, the electrolytic solution includes the addition compound. The addition compound includes one or more of the diphenyl carbonate compound, the unsaturated cyclic carbonate ester, the first maleic anhydride compound, and the second maleic anhydride compound.

In such a case, as described above, even if the negative electrode 22 includes the low reaction potential material as the negative electrode active material and has the electrochemical capacity per unit area of less than or equal to the electrochemical capacity per unit area of the positive electrode 21, the satisfactory film to cover the surface of the negative electrode 22 is formed at the time of earlier cycles of charging and discharging, thereby reducing the decomposition reaction of the electrolytic solution. Accordingly, it is possible to achieve superior battery characteristics even if the low reaction potential material is used as the negative electrode active material.

In particular, the electrolytic solution may include the second maleic anhydride compound. This makes it easier to form the film and improves the structure of the film, which makes it possible to achieve higher effects accordingly. In this case, if the second maleic anhydride compound is the compound represented by Formula (5), the film is more easily formed and the structure of the film further improves, which makes it possible to achieve further higher effects accordingly.

Further, the negative electrode active material (the low reaction potential material) may include, for example, a material such as the titanium oxide. This reduces the decomposition reaction of the electrolytic solution due to the electrochemical stability (low reactivity) of the negative electrode active material, making it possible to achieve higher effects accordingly.

Further, the content of the addition compound in the electrolytic solution may be higher than or equal to 0.1 wt % and lower than or equal to 10 wt %. This makes the solubility of the addition compound to be secured and sufficiently improves the chemical stability of the electrolytic solution. It is possible to achieve higher effects accordingly.

Further, the positive electrode active material may include the high reaction potential material as the positive electrode active material. The electrochemical stability (low reactivity) of the high reaction potential material helps to reduce the decomposition reaction of the electrolytic solution, making it possible to achieve higher effects accordingly. In this case, the high reaction potential material may include the lithium manganese iron phosphate compound. This further reduces the decomposition reaction of the electrolytic solution, making it possible to achieve higher effects accordingly.

Figure 3:
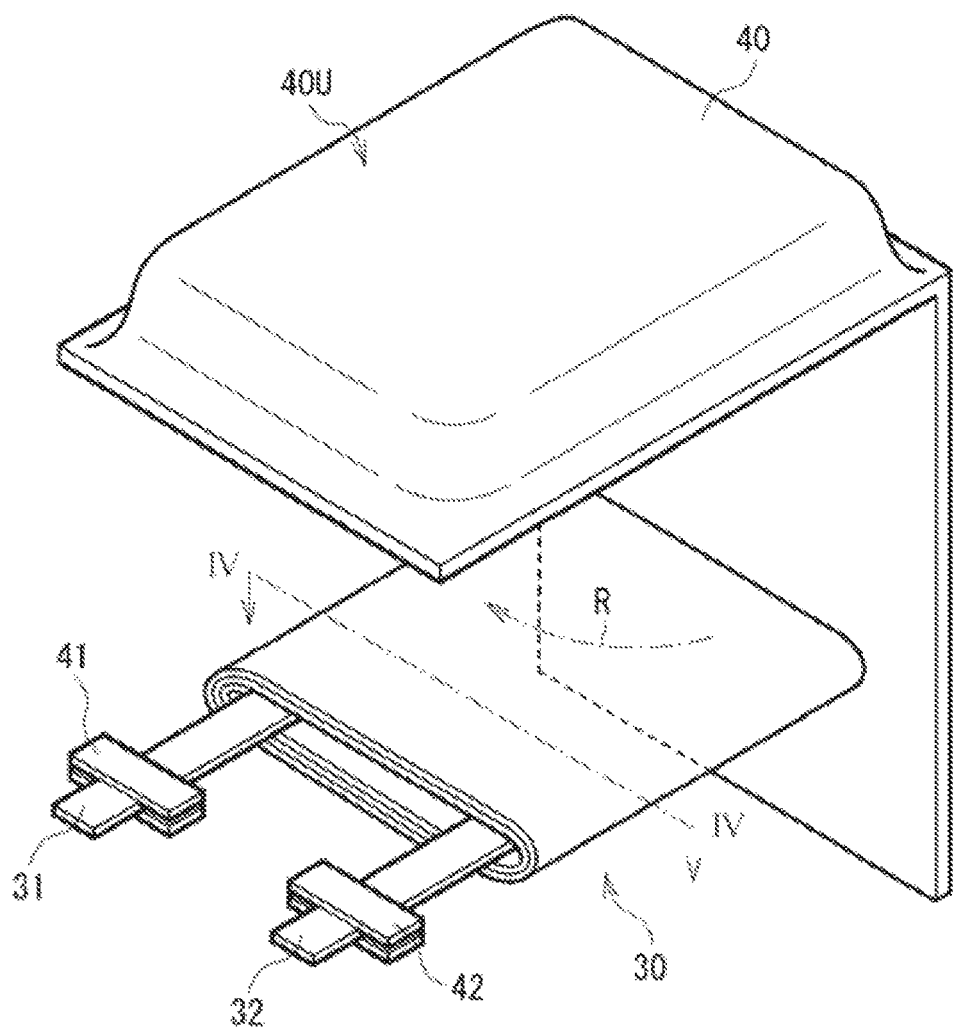
FIG. 3 is a perspective view of a configuration of another lithium-ion secondary battery (laminated-film type) according to an embodiment of the present technology.
Figure 4:
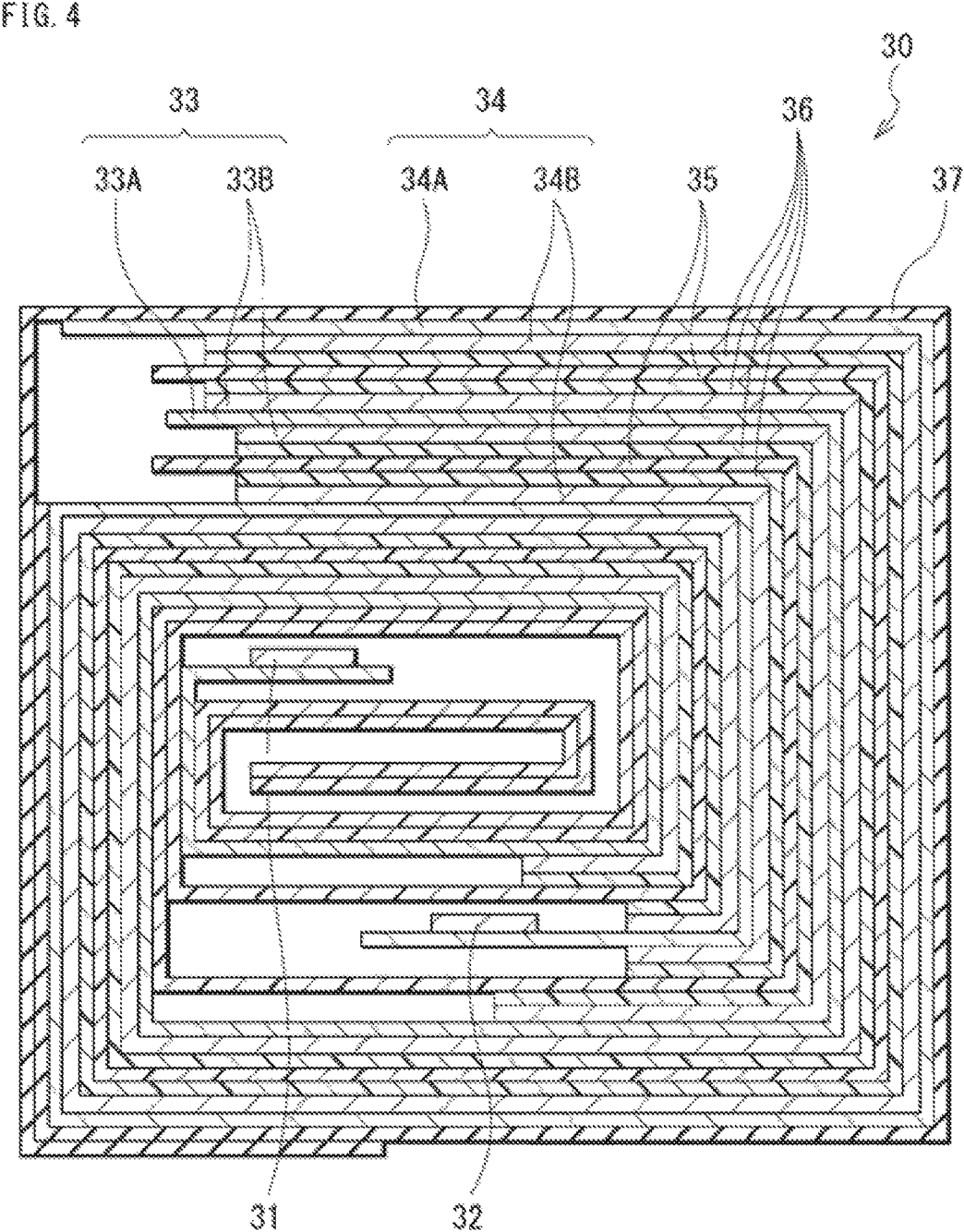
FIG. 4 is an enlarged sectional view of a configuration of a main part of the lithium-ion secondary battery illustrated in FIG. 3.

FIG. 3 is a perspective view of a configuration of another lithium-ion secondary battery. FIG. 4 is an enlarged sectional configuration of a main part, i.e., a wound electrode body 30, of the lithium-ion secondary battery taken along a line IV-IV illustrated in FIG. 3. It should be understood that FIG. 4 illustrates a state in which the wound electrode body 30 and an outer package member 40 are separated away from each other.

In the following description, the components of the cylindrical lithium-ion secondary battery described already are referred to where appropriate with reference to FIGS. 1 and 2.

Referring to FIG. 3, the lithium-ion secondary battery is of a laminated-film type, for example. The laminated lithium-ion secondary battery is provided with the outer package member 40 that has a film shape. The outer package member 40 contains a battery device, i.e., the wound electrode body 30. The outer package member 40 has softness or flexibility.

The wound electrode body 30 has a structure in which a positive electrode 33 and a negative electrode 34 are stacked on each other with a separator 35 and an electrolyte layer 36 interposed therebetween and in which the positive electrode 33, the negative electrode 34, the separator 35, and the electrolyte layer 36 are wound, for example. A surface of the wound electrode body 30 is protected by means of, for example, a protective tape 37. The electrolyte layer 36 is interposed between the positive electrode 33 and the separator 35, and is also interposed between the negative electrode 34 and the separator 35, for example.

A positive electrode lead 31 is coupled to the positive electrode 33. The positive electrode lead 31 is led out from inside to outside of the outer package member 40. The positive electrode lead 31 includes a material similar to a material included in the positive electrode lead 25, for example. The positive electrode lead 31 has a shape such as a thin-plate shape or a meshed shape.

A negative electrode lead 32 is coupled to the negative electrode 34. The negative electrode lead 32 is led out from the inside to the outside of the outer package member 40. The direction in which the negative electrode lead 32 is led out is similar to that of the positive electrode lead 31, for example. The negative electrode lead 32 includes a material similar to a material included in the negative electrode lead 26. The negative electrode lead 32 has a shape similar to that of the positive electrode lead 31, for example.

The outer package member 40 is, for example, a single film that is foldable in a direction of an arrow R illustrated in FIG. 3. The outer package member 40 includes a portion having a depression 40U, for example. The depression 40U is adapted to contain the wound electrode body 30.

The outer package member 40 is a stacked body or a laminated film including, for example, a fusion-bonding layer, a metal layer, and a surface protective layer that are stacked in this order from an inner side to an outer side. In a process of manufacturing the lithium-ion secondary battery, for example, the outer package member 40 is folded in such a manner that portions of the fusion-bonding layer oppose each other with the wound electrode body 30 interposed therebetween. Thereafter, outer edges of the fusion-bonding layer are fusion-bonded to each other. The fusion-bonding layer is a film that includes, for example, a polymer compound such as polypropylene. The metal layer is, for example, a metal foil that includes a metal material such as aluminum. The surface protective layer is a film that includes, for example, a polymer compound such as nylon. The outer package member 40 may include, for example, two laminated films that are adhered to each other by means of a material such as an adhesive.

A sealing film 41, for example, is interposed between the outer package member 40 and the positive electrode lead 31. The sealing film 41 is adapted to prevent entry of outside air. The sealing film 41 includes a material having adherence to the positive electrode lead 31. Examples of such a material include a polyolefin resin such as polypropylene.

A sealing film 42, for example, is interposed between the outer package member 40 and the negative electrode lead 32. The sealing film 42 has a function similar to that of the sealing film 41. A material included in the sealing film 42 is similar to the material included in the sealing film 41 except that the material included in the sealing film 42 has adherence to the negative electrode lead 32, not to the positive electrode lead 31.

The positive electrode 33 includes, for example, a positive electrode current collector 33A and a positive electrode active material layer 33B. The negative electrode 34 includes, for example, a negative electrode current collector 34A and a negative electrode active material layer 34B. The positive electrode current collector 33A, the positive electrode active material layer 33B, the negative electrode current collector 34A, and the negative electrode active material layer 34B respectively have configurations similar to those of the positive electrode current collector 21A, the positive electrode active material layer 21B, the negative electrode current collector 22A, and the negative electrode active material layer 22B, for example. That is, the negative electrode 34 includes a low reaction potential material as the negative electrode active material and has an electrochemical capacity per unit area of less than or equal to an electrochemical capacity per unit area of the positive electrode 33. The separator 35 has a configuration similar to that of the separator 23, for example.

The electrolyte layer 36 includes an electrolytic solution and a polymer compound. The electrolyte layer 36 described here is a so-called gel electrolyte in which the polymer compound holds the electrolytic solution. A reason for this is that high ionic conductivity is obtainable and leakage of the electrolytic solution is prevented. The high ionic conductivity is 1 mS/cm or higher at room temperature, for example. The electrolyte layer 36 may further include other materials including, without limitation, various additives.

A configuration of the electrolytic solution is as described above. That is, the electrolytic solution includes a solvent, an electrolyte salt, and an addition compound. The polymer compound includes, for example, a homopolymer, a copolymer, or both. Examples of the homopolymer include polyvinylidene difluoride. Examples of the copolymer include a copolymer of vinylidene fluoride and hexafluoropylene.

Regarding the electrolyte layer 36 which is a gel electrolyte, the concept of the solvent included in the electrolytic solution is broad and encompasses not only a liquid material but also an ion-conductive material that is able to dissociate the electrolyte salt. Accordingly, in a case of using an ion-conductive polymer compound, the polymer compound is also encompassed by the solvent.

The lithium-ion secondary battery operates as follows, for example. Upon charging the lithium-ion secondary battery, lithium ions are extracted from the positive electrode 33, and the extracted lithium ions are inserted into the negative electrode 34 via the electrolyte layer 36. Upon discharging the lithium-ion secondary battery, lithium ions are extracted from the negative electrode 34, and the extracted lithium ions are inserted into the positive electrode 33 via the electrolyte layer 36.

The lithium-ion secondary battery including the electrolyte layer 36 is manufactured by any of the following three types of procedures, for example.

First, the positive electrode 33 is fabricated by a procedure similar to that of the positive electrode 21. That is, the positive electrode 33 is fabricated by forming the positive electrode active material layers 33B on both sides of the positive electrode current collector 33A. Further, the negative electrode 34 is fabricated by a procedure similar to that of the negative electrode 22. That is, the negative electrode 34 is fabricated by forming the negative electrode active material layers 34B on both sides of the negative electrode current collector 34A.

Thereafter, the electrolytic solution is prepared, following which the prepared electrolytic solution, the polymer compound, and a material such as an organic solvent are mixed to thereby prepare a precursor solution. Thereafter, the precursor solution is applied on the positive electrode 33, following which the applied precursor solution is dried to thereby form the electrolyte layer 36. The precursor solution is also applied on the negative electrode 34, following which the applied precursor solution is dried to thereby form the electrolyte layer 36. Thereafter, the positive electrode lead 31 is coupled to the positive electrode current collector 33A by a method such as a welding method, and the negative electrode lead 32 is coupled to the negative electrode current collector 34A by a method such as a welding method. Thereafter, the positive electrode 33 and the negative electrode 34 are stacked on each other with the separator 35 and the electrolyte layer 36 interposed therebetween, following which the positive electrode 33, the negative electrode 34, the separator 35, and the electrolyte layer 36 are wound to thereby form the wound electrode body 30. Thereafter, the protective tape 37 is attached to a surface of the wound electrode body 30.

Lastly, the outer package member 40 is folded in such a manner as to sandwich the wound electrode body 30, following which the outer edges of the outer package member 40 are bonded to each other by a method such as a thermal fusion bonding method. In this case, the sealing film 41 is disposed between the outer package member 40 and the positive electrode lead 31, and the sealing film 42 is disposed between the outer package member 40 and the negative electrode lead 32. Thus, the wound electrode body 30 is sealed in the outer package member 40. As a result, the lithium-ion secondary battery is completed.

[Second Procedure]

First, the positive electrode 33 and the negative electrode 34 are fabricated. Thereafter, the positive electrode lead 31 is coupled to the positive electrode 33, and the negative electrode lead 32 is coupled to the negative electrode 34. Thereafter, the positive electrode 33 and the negative electrode 34 are stacked on each other with the separator 35 interposed therebetween, following which the positive electrode 33, the negative electrode 34, and the separator 35 are wound to thereby form a wound body. Thereafter, the protective tape 37 is attached to a surface of the wound body. Thereafter, the outer package member 40 is folded in such a manner as to sandwich the wound body, following which the outer edges excluding one side of the outer package member 40 are bonded to each other by a method such as a thermal fusion bonding method. Thus, the wound body is contained in the pouch-shaped outer package member 40.

Thereafter, the electrolytic solution, the monomers, and a polymerization initiator are mixed, following which the mixture is stirred to thereby prepare a composition for electrolyte. The monomers are raw materials of the polymer compound. Another material such as a polymerization inhibitor is mixed on an as-needed basis in addition to the electrolytic solution, the monomers, and the polymerization initiator. Thereafter, the composition for electrolyte is injected into the pouch-shaped outer package member 40, following which the outer package member 40 is sealed by a method such as a thermal fusion bonding method. Lastly, the monomers are thermally polymerized to thereby form the polymer compound. This allows the electrolytic solution to be held by the polymer compound, thereby forming the electrolyte layer 36. Thus, the wound electrode body 30 is sealed in the outer package member 40. As a result, the lithium-ion secondary battery is completed.

First, a wound body is fabricated and the wound body is contained in the pouch-shaped outer package member 40 thereafter by a procedure similar to the second procedure, except for using the separator 35 that includes polymer compound layers provided on both sides of a base layer. Thereafter, the electrolytic solution is injected into the outer package member 40, following which an opening of the outer package member 40 is sealed by a method such as a thermal fusion bonding method. Lastly, the outer package member 40 is heated with a weight being applied to the outer package member 40 to thereby cause the separator 35 to be closely attached to each of the positive electrode 33 and the negative electrode 34 with the polymer compound layer interposed therebetween. The polymer compound layer is thereby impregnated with the electrolytic solution to be gelated, forming the electrolyte layer 36. Thus, the wound electrode body 30 is sealed in the outer package member 40. As a result, the lithium-ion secondary battery is completed.

The third procedure helps to reduce swelling of the lithium-ion secondary battery, in contrast to the first procedure. The third procedure also helps to prevent the solvent and the monomers, which are the raw materials of the polymer compound, from remaining in the electrolyte layer 36, in contrast to the second procedure. Accordingly, the electrolyte layer 36 is sufficiently closely attached to each of the positive electrode 33, the negative electrode 34, and the separator 35.

According to the laminated lithium-ion secondary battery, in the case where the negative electrode 34 includes the low reaction potential material as the negative electrode active material and has the electrochemical capacity per unit area of less than or equal to the electrochemical capacity per unit area of the positive electrode 33, the electrolytic solution included in the electrolyte layer 36 includes the addition compound. This reduces the decomposition reaction of the electrolytic solution for a reason similar to that described in relation to the cylindrical lithium-ion secondary battery. Accordingly, it is possible to achieve superior battery characteristics. Other action and effects related to the laminated lithium-ion secondary battery are similar to those related to the cylindrical lithium-ion secondary battery.

The laminated lithium-ion secondary battery may include the electrolytic solution instead of the electrolyte layer 36. In this case, the wound electrode body 30 is impregnated with the electrolytic solution, thus, each of the positive electrode 33, the negative electrode 34, and the separator 35 is impregnated with the electrolytic solution. Further, the wound body is contained in the pouch-shaped outer package member 40, following which the electrolytic solution is injected into the pouch-shaped outer package member 40 to thereby impregnate the wound body with the electrolytic solution. As a result, the wound electrode body 30 is formed. Similar effects are also obtainable in this case.

Examples of applications of the lithium-ion secondary battery are as described below.

The applications of the lithium-ion secondary battery are not particularly limited as long as they are, for example, machines, apparatuses, instruments, devices, or systems (assembly of a plurality of apparatuses, for example) in which the lithium-ion secondary battery is usable as a driving power source, an electric power storage source for electric power accumulation, or any other source. The lithium-ion secondary battery used as a power source may serve as a main power source or an auxiliary power source. The main power source is preferentially used regardless of the presence of any other power source. The auxiliary power source may be, for example, used in place of the main power source, or may be switched from the main power source on an as-needed basis. In a case where the lithium-ion secondary battery is used as the auxiliary power source, the kind of the main power source is not limited to the lithium-ion secondary battery.

Examples of the applications of the lithium-ion secondary battery include: electronic apparatuses including portable electronic apparatuses; portable life appliances; storage devices; electric power tools; battery packs mountable on laptop personal computers or other apparatuses as a detachable power source; medical electronic apparatuses; electric vehicles; and electric power storage systems. Examples of the electronic apparatuses include video cameras, digital still cameras, mobile phones, laptop personal computers, cordless phones, headphone stereos, portable radios, portable televisions, and portable information terminals. Examples of the portable life appliances include electric shavers. Examples of the storage devices include backup power sources and memory cards. Examples of the electric power tools include electric drills and electric saws. Examples of the medical electronic apparatuses include pacemakers and hearing aids. Examples of the electric vehicles include electric automobiles including hybrid automobiles. Examples of the electric power storage systems include home battery systems for accumulation of electric power for emergency. Needless to say, the lithium-ion secondary battery may have applications other than those described above.

EXAMPLES

A description is given of Examples of the technology below.

The laminated lithium-ion secondary batteries illustrated in FIGS. 3 and 4 were fabricated and their respective battery characteristics were evaluated as described below.

In a case of fabricating the positive electrode 33, first, 90.5 parts by mass of the positive electrode active material ($LiMn_{0.75}Fe_{0.25}PO_4$ serving as a high reaction potential material (the lithium manganese iron phosphate compound)), 5.0 parts by mass of the positive electrode binder (polyvinylidene difluoride), and 4.5 parts by mass of the positive electrode conductor (graphite) were mixed with each other to thereby obtain a positive electrode mixture. Thereafter, the positive electrode mixture was put into an organic solvent (N-methyl-2-pyrrolidone), following which the organic solvent was stirred to thereby prepare a paste positive electrode mixture slurry. Thereafter, the positive electrode mixture slurry was applied on both sides of the positive electrode current collector 33A (a band-shaped aluminum foil having a thickness of 12 μm) by means of a coating apparatus, following which the applied positive electrode mixture slurry was dried to thereby form the positive electrode active material layers 33B. Lastly, the positive electrode active material layers 33B were compression-molded by means of a roll pressing machine.

In a case of fabricating the negative electrode 34, first, 90.5 parts by mass of the negative electrode active material ($Li_4Ti_5O_{12}$ serving as a low reaction potential material (a lithium-titanium composite oxide)), 5.0 parts by mass of the negative electrode binder (polyvinylidene difluoride), and 4.5 parts by mass of the negative electrode conductor (graphite) were mixed with each other to thereby obtain a negative electrode mixture. Thereafter, the negative electrode mixture was put into an organic solvent (N-methyl-2-pyrrolidone), following which the organic solvent was stirred to thereby prepare a paste negative electrode mixture slurry. Thereafter, the negative electrode mixture slurry was applied on both sides of the negative electrode current collector 34A (a band-shaped copper foil having a thickness of 15 µm) by means of a coating apparatus, following which the applied negative electrode mixture slurry was dried to thereby form the negative electrode active material layers 34B. Lastly, the negative electrode active material layers 34B were compression-molded by means of a roll pressing machine.

In the case of fabricating each of the positive electrode 33 and the negative electrode 34, an amount of the positive electrode active material and an amount of the negative electrode active material were adjusted with respect to each other to thereby set a magnitude relation between the electrochemical capacity per unit area of the positive electrode 33 and the electrochemical capacity per unit area of the negative electrode 34 and set an end-of-charge electrode to those indicated in Table 1.

In a case of preparing the electrolytic solution, the electrolyte salt (lithium hexafluorophosphate) was added to a solvent (propylene carbonate and dimethyl carbonate), following which the solvent was stirred. In this case, a mixture ratio (a volume ratio) between propylene carbonate and dimethyl carbonate in the solvent was set to 40:60, and the content of the electrolyte salt with respect to the solvent was set to 1 mol/l (=1 mol/dm³). Thereafter, the addition compound was added to the solvent, following which the solvent was stirred. Used as the addition compound were: diphenyl carbonate (DPC) serving as the diphenyl carbonate compound; vinylene carbonate (VC) serving as the unsaturated cyclic carbonate ester; maleic anhydride (MA) serving as the first maleic anhydride compound; and a compound (ethylene-maleic anhydride copolymer having a weight average molecular weight of 100000 to 500000) represented by Formula (5), serving as the second maleic anhydride compound. The content of each addition compound in the electrolytic solution was as described in Table 1.

For comparison, electrolytic solutions were prepared in accordance with a similar procedure except that the addition compound was not used.

In a case of assembling the lithium-ion secondary battery, first, the positive electrode lead 31 including aluminum was welded to the positive electrode current collector 33A, and the negative electrode lead 32 including copper was welded to the negative electrode current collector 34A. Thereafter, the positive electrode 33 and the negative electrode 34 were stacked on each other with the separator 35 (a fine-porous polyethylene film having a thickness of 15 µm) interposed therebetween to thereby obtain a stacked body. Thereafter, the stacked body was wound, following which the protective tape 37 was attached to the stacked body to thereby obtain a wound body.

Thereafter, the outer package member 40 was folded in such a manner as to sandwich the wound body, following which the outer edges of two sides of the outer package member 40 were thermal fusion bonded to each other. As the outer package member 40, an aluminum laminated film was used in which a surface protective layer (a nylon film having a thickness of 25 µm), a metal layer (an aluminum foil having a thickness of 40 µm), and a fusion-bonding layer (a polypropylene film having a thickness of 30 µm) were stacked in this order. In this case, the sealing film 41 (a polypropylene film) was interposed between the outer package member 40 and the positive electrode lead 31, and the sealing film 42 (a polypropylene film) was interposed between the outer package member 40 and the negative electrode lead 32.

Lastly, the electrolytic solution was injected into the outer package member 40 to thereby impregnate the wound body with the electrolytic solution, and thereafter, the outer edges of one of the remaining sides of the outer package member 40 were thermal fusion bonded to each other in a reduced-pressure environment. Thus, the wound electrode body 30 was formed, being sealed in the outer package member 40. As a result, the laminated lithium-ion secondary battery was completed.

Evaluation of battery characteristics of the lithium-ion secondary batteries revealed the results described in Table 1. A cyclability characteristic and an electric resistance characteristic were evaluated here as the battery characteristics.

In a case of examining the cyclability characteristic, first, the lithium-ion secondary battery was charged and discharged for one cycle in an ambient temperature environment (at a temperature of 23° C.) in order to stabilize a state of the lithium-ion secondary battery.

Thereafter, the lithium-ion secondary battery was repeatedly charged and discharged for 518 cycles in total in a high temperature environment (at a temperature of 45° C.) in a manner that a series of cycle conditions from (A) to (K) below was followed in this order.

(A) Three cycles of charging and discharging
(B) 100 cycles of charging and discharging
(C) Three cycles of charging and discharging
(D) 100 cycles of charging and discharging
(E) Three cycles of charging and discharging
(F) 100 cycles of charging and discharging
(G) Three cycles of charging and discharging
(H) 100 cycles of charging and discharging
(I) Three cycles of charging and discharging
(J) 100 cycles of charging and discharging
(K) Three cycles of charging and discharging Charging and discharging conditions for the three cycles of each of (A), (C), (E), (G), (I), and (K) were as follows. Upon the charging and discharging at the initial cycle, the lithium-ion secondary battery was charged with a constant current of 0.05 C until a voltage reached 3.0 V, and was thereafter charged with a constant voltage of 3.0 V until a current reached 0.05 C and discharged with a constant current of 0.05 C until the voltage reached 0.5 V. Charging and discharging conditions at the second cycle were similar to the charging and discharging conditions at the initial cycle except that the current at the time of charging and the current at the time of discharging were each changed to 0.1 C. Charging and discharging conditions at the third cycle were similar to the charging and discharging conditions at the initial cycle except that the current at the time of charging and the current at the time of discharging were each changed to 0.2 C.

Upon charging and discharging for the 100 cycles of each of (B), (D), (F), (H), and (J), the lithium-ion secondary battery was charged with a constant current of 1 C until the voltage reached 3.0 V, and was thereafter charged with a constant voltage of 3.0 V until the current reached 0.05 C and discharged with a constant current of 1 C until the voltage reached 0.5 V.

It should be understood that 0.05 C. 0.1 C, 0.2 C, and 1 C are values of currents that cause battery capacities (theoretical capacities) to be completely discharged in 20 hours, 10 hours, 5 hours, and 1 hour, respectively.

Lastly, a dynamic capacity retention rate (%) and a static capacity retention rate (%) were calculated by the following procedure.

To calculate the dynamic capacity retention rate, a discharge capacity of a case where the current at the time of C.) until a state of charge (SOC) reached 50%, following which an impedance (Q) of the lithium-ion secondary battery was measured using an electrochemical measurement device (VPM3, a multi-channel electrochemical measurement system available from Bio-Logic).

Upon the charging, the lithium-ion secondary battery was charged with a constant current of 0.2 C until an electrochemical capacity of 50% was obtained, with respect to a discharge capacity serving as a reference. The discharge capacity serving as the reference corresponded to that which was obtained when the lithium-ion secondary battery was charged with a constant current of 0.2 C until the voltage reached 3.0 V and was thereafter charged with a constant voltage of 3.0 V until the current reached 0.05 C and discharged with a constant current of 0.2 C until the voltage reached 0.5 V. Measurement conditions of the impedance were as follows: a frequency range was set to 1 MHz to 10 mHz and an alternating current amplitude (AC Amplitude) was set to 10 mV. With such conditions, an impedance at a frequency of 10 Hz was measured.

TABLE 1

(Positive electrode active material: $LiMn_{0.75}Fe_{0.25}PO_4$, Negative electrode active material: $Li_4Ti_5O_{12}$)

| Experiment example | Magnitude relation of electrochemical capacity | End-of-charge electrode | Addition compound Kind | Addition compound Content (wt %) | Dynamic capacity retention rate (%) | Static capacity retention rate (%) | Impedance (Ω) |
|---|---|---|---|---|---|---|---|
| 1 | Positive electrode ≥ negative electrode | Negative electrode | — | — | 57.0 | 83.2 | 45 |
| 2 | Positive electrode ≥ negative electrode | Negative electrode | DPC | 1.0 | 61.3 | 85.0 | 44 |
| 3 | Positive electrode ≥ negative electrode | Negative electrode | VC | 1.0 | 84.2 | 90.2 | 44 |
| 4 | Positive electrode ≥ negative electrode | Negative electrode | MA | 1.0 | 62.5 | 84.6 | 20 |
| 5 | Positive electrode > negative electrode | Negative electrode | PEMA | 0.5 | 95.8 | 97.9 | 15 |
| 6 | Positive electrode < negative electrode | Positive electrode | — | — | 42.2 | 67.1 | 200 |
| 7 | Positive electrode < negative electrode | Positive electrode | DPC | 1.0 | 56.3 | 62.9 | 190 |
| 8 | Positive electrode < negative electrode | Positive electrode | VC | 1.0 | 57.2 | 64.3 | 180 |
| 9 | Positive electrode < negative electrode | Positive electrode | MA | 1.0 | 51.5 | 57.9 | 250 |
| 10 | Positive electrode < negative electrode | Positive electrode | PEMA | 0.5 | 52.1 | 58.6 | 225 | charging (the current at the time of discharging) was set to 0.2 C was measured in (A), and a discharge capacity of a case where the current at the time of charging (the current at the time of discharging) was set to 0.2 C was measured in (K), following which the following was calculated: dynamic capacity retention rate (%)=(discharge capacity measured in (K)/discharge capacity measured in (A))×100.

To calculate the static capacity retention rate, a discharge capacity of a case where the current at the time of charging (the current at the time of discharging) was set to 0.05 C was measured in (A), and a discharge capacity of a case where the current at the time of charging (the current at the time of discharging) was set to 0.05 C was measured in (K), following which the following was calculated: static capacity retention rate (%)=(discharge capacity measured in (K)/discharge capacity measured in (A))×100.

In a case of examining the electric resistance characteristic, the lithium-ion secondary battery was charged in an ambient temperature environment (at a temperature of 25°

As described in Table 1, in the case of using the low reaction potential material (the lithium-titanium composite oxide serving as a titanium-containing compound) as the negative electrode active material, the cyclability characteristic and the electric resistance characteristic each varied greatly depending on the configuration of the lithium-ion secondary battery.

Specifically, in the case where the end-of-charge electrode was the positive electrode 33 (Experiment examples 6 to 10) because the electrochemical capacity per unit area of the negative electrode 34 was greater than the electrochemical capacity per unit area of the positive electrode 33, the dynamic capacity retention rate increased while the static capacity retention rate decreased and the impedance hardly decreased if the electrolytic solution included the addition compound (Experiment examples 7 to 10), as compared with those in the case where the electrolytic solution included no addition compound (Experiment example 6). In particular, in the case where the electrolytic solution included the addition compound, the impedance rather increased depending on the kind of the addition compound.

In contrast, in the case where the end-of-charge electrode was the negative electrode 34 (Experiment examples 1 to 5) because the electrochemical capacity per unit area of the negative electrode 34 was less than or equal to the electrochemical capacity per unit area of the positive electrode 33, the dynamic capacity retention rate and the static capacity retention rate both increased and the impedance decreased if the electrolytic solution included the addition compound (Experiment examples 2 to 5), as compared with those in the case where the electrolytic solution included no addition compound (Experiment example 1).

Based upon the above results, in the case where the negative electrode 34 included the low reaction potential material as the negative electrode active material and had the electrochemical capacity per unit area of less than or equal to the electrochemical capacity per unit area of the positive electrode 33, the inclusion of the addition compound in the electrolytic solution improved the cyclability characteristic and the electric resistance characteristic. Accordingly, superior battery characteristics of the lithium-ion secondary batteries were obtained.

Although the technology has been described above with reference to some embodiments and Examples, embodiments of the technology are not limited to those described with reference to the embodiments and the Examples above and are modifiable in a variety of ways.

Specifically, although the description has been given of the cylindrical lithium-ion secondary battery and the laminated lithium-ion secondary battery, this is non-limiting. For example, the lithium-ion secondary battery may be of any other type such as a prismatic type or a coin type.

Moreover, although the description has been given of a case of the battery device having a wound structure, this is non-limiting. For example, the battery device may have any other structure such as a stacked structure.

It should be understood that the effects described herein are mere examples, and effects of the technology are therefore not limited to those described herein. Accordingly, the technology may achieve any other effect.

It should be understood by those skilled in the art that various modifications, combinations, sub-combinations, and alterations may occur depending on design requirements and other factors. Such changes and modifications can be made without departing from the spirit and scope of the present subject matter and without diminishing its intended advantages. It is therefore intended that such changes and modifications be covered by the appended claims.

The invention claimed is:

1. A lithium-ion secondary battery comprising:
a positive electrode including a positive electrode active material;
a negative electrode that includes a negative electrode active material having a reaction potential of 0.5 volts or higher than a lithium electrode, and has an electrochemical capacity per unit area of less than or equal to an electrochemical capacity per unit area of the positive electrode; and
an electrolytic solution including a solvent, an electrolyte salt, and an ethylene-maleic anhydride copolymer,
wherein an amount of the ethylene-maleic anhydride copolymer is from 0.3 wt % to 2.0 wt %,
wherein the positive electrode active material is a lithium manganese iron phosphate compound and the negative electrode active material is a lithium titanium composite compound, and
wherein the electrolyte salt is lithium hexafluorophosphate and the solvent is propylene carbonate and dimethyl carbonate.

2. The lithium-ion secondary battery according to claim 1, wherein the positive electrode includes a positive electrode active material having a reaction potential of 4.0 volts or higher than a lithium electrode.

3. The lithium-ion secondary battery according to claim 1, wherein the lithium manganese iron phosphate compound is $LiMn_{0.75}Fe_{0.25}PO_4$ and the lithium titanium composite compound is $Li_4Ti_5O_{12}$.

4. The lithium-ion secondary battery according to claim 1, wherein the electrolytic solution further includes a compound represented by one or more of Formula (1), Formula (2) and Formula (3):

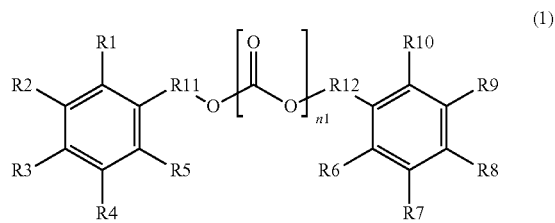

(1)

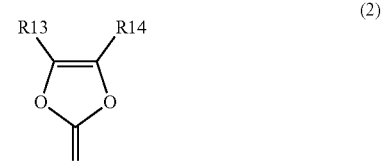

(2)

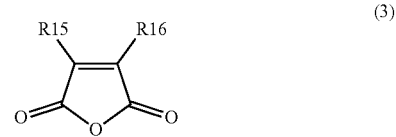

(3)

wherein
each of R1 to R10 and R13 to R16 includes one of a hydrogen atom, a halogen atom, a monovalent hydrocarbon group, and a monovalent halogenated hydrocarbon group,
each of R11 and R12 includes one of a divalent hydrocarbon group and a divalent halogenated hydrocarbon group,
each of R11 and R12 is omittable, and
n1 is an integer of 1 or greater.

5. The lithium-ion secondary battery according to claim 1, wherein the lithium manganese iron phosphate compound is $LiMn_{0.75}Fe_{0.25}PO_4$ and the lithium titanium composite compound is $Li_4Ti_5O_{12}$, and wherein the amount of the ethylene-maleic anhydride copolymer is about 0.5 wt %.

6. The lithium-ion secondary battery according to claim 1, wherein a weight average molecular weight of the ethylene-maleic anhydride copolymer is 100000 to 500000.

* * * * *